May 18, 1926.
C. B. CURTISS
1,584,980
AUTOMOBILE WINCH MOUNTING
Filed May 19, 1921
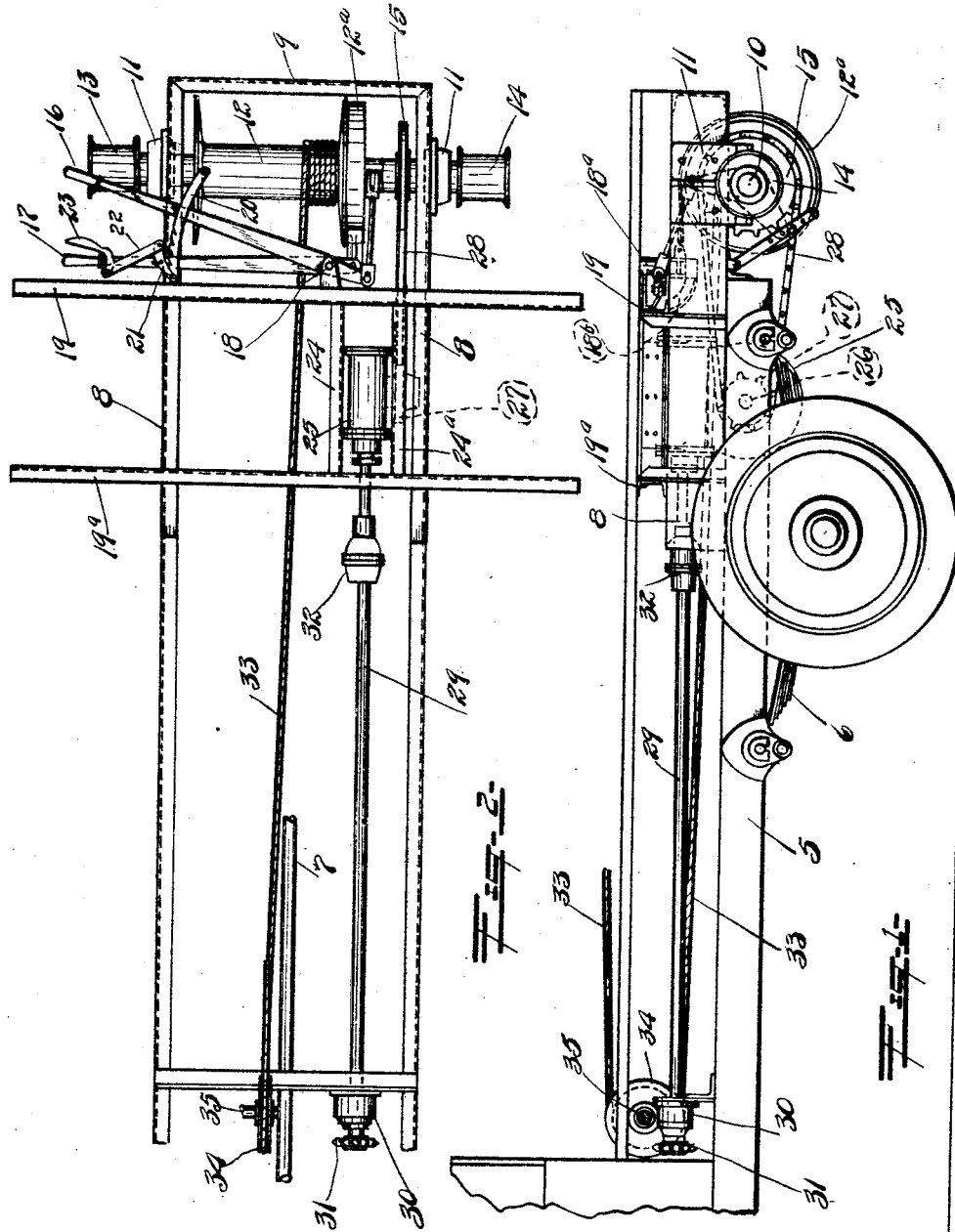
INVENTOR.
Charles B. Curtiss.
BY
Frank C. Harman.
ATTORNEY.

Patented May 18, 1926.

1,584,980

UNITED STATES PATENT OFFICE.

CHARLES B. CURTISS, OF BAY CITY, MICHIGAN.

AUTOMOBILE WINCH MOUNTING.

Application filed May 19, 1921. Serial No. 470,804.

This invention relates to winch equipped motor trucks and particularly to the manner of mounting the winch on the chassis of the truck.

The prime object of my invention is to mount a standard winch on a truck chassis, so that the rope or cable which is wound on the drum may lead directly from this drum to a sheave located back of the truck seat, without the necessity of resorting to additional sheaves or guides to enable the rope or cable to clear the cross members of the chassis as is required when the winch is mounted in the usual underslung position.

A further object is to mount the winch on the truck in units, and in such manner that the larger and heavier unit can be quickly removed when it is not necessary to use the winch for sometime, thereby eliminating the transporting of this useless load.

A further object still is to design a winch mechanism which can be attached to any standard make of truck without altering the truck structure in any manner whatsoever.

With these and other objects in view, the present invention consists in certain novel features of construction and combination of parts as hereinafter set forth, illustrated in the accompanying drawing, and particularly pointed out in the appended claims.

In the drawing:—

Fig. 1 is a fragmentary side view of a conventional automobile truck illustrating a winch mounted on the rear end thereof.

Fig. 2 is a top plan view thereof showing the body removed.

This arrangement is particularly designed for transporting, loading and unloading cable reels, pulling out old underground cables, putting in new cables and the like, but it will be readily understood that it may be used for a large number of other purposes with equally favorable results.

In the drawing I have indicated the truck chassis by the numeral 5, this constitutes the running gear and frame of the truck which is supported on the usual springs 6, it is further provided with the engine and differential mechanism (not shown) a short section of the drive shaft 7 being shown to illustrate its position with relation to the winch driving means.

A pair of channel members 8 are superimposed on this frame 5 and are rigidly secured thereto, the rear ends extending beyond the end of the frame, the members being connected together by means of a similar channel 9 and forming a superimposed frame, a winch mechanism is hung from this superimposed frame and comprises a main shaft 10 journaled in spherical bearings 11, used to prevent binding of the shaft in the bearings due to torsional twisting of the chassis, a drum member 12 is mounted thereon and is provided with the usual flanged end 12ª adapted to receive a brake band and designed to act with the mating part as an engaging clutch, nigger heads 13 and 14 are also mounted on the end of the shaft 10, and a sprocket 15 is interposed between the drum and the nigger head for driving the said winch, the winch, is adapted to be friction driven, but this is however immaterial as this invention is directed to the mounting of the winch on the truck.

The winch is adapted to be controlled by means of hand operated levers 16 and 17, which are pivoted at 18 to a suitable lug and bracket 18ª and 18ᵇ rigidly secured to one of the transverse members 19, the lever 16 being the clutch lever and is adapted to control the drum, and the lever 17 is the brake lever and is connected to the brake band in the usual manner. An ordinary quadrant 20 is secured to the body of the truck and is provided with notches in the edge thereof adapted to be engaged by a dog 21 which is pivoted to the lever as shown, the opposite end of the dog having pivotal connection with a link 22 which is attached to the hand grip 23, also pivoted to the lever 17, and it will be obvious that by forcing the grip 23 towards the lever, the dog will be released from the notches.

Short longitudinal members 24 and 24ª are secured to the members 19 and 19ª and a worm and worm wheel assembly or unit 25 is suitably secured between them, the worm wheel is mounted on the shaft 26 which projects from the housing and carries a sprocket 27, a suitable chain 28 extending to the sprocket 15 for imparting motion thereto.

The drive for the winch comprises a shaft 29 journaled at its forward end in a bearing 30 and having a sprocket 31 secured thereon, this sprocket is adapted to be driven by means of a chain and sprocket mounted on the power take off shaft (not shown) and a universal joint 32 is provided intermediate the length of the shaft 29, the opposite end extending into the worm and worm wheel housing 25 and having a worm mounted thereon, this worm engages the worm wheel mounted on the shaft 26 which also carries the sprocket 27 for driving the winch.

One end of a cable 33 is adapted to be anchored on the drum 12, the free end extending forwardly and is trained over a sheave 34 which is mounted on shaft 35 thence extending rearwardly to the work, this is the arrangement when it is desired to load on the truck, and when pulling from the rear, the rope or cable will lead off the underside of the drum, and I wish to direct particular attention to the fact that by mounting the winch as shown it eliminates the necessity of additional sheaves or guides between the drum and the sheave directly back of the seat, this distance will allow the rope or cable to lead back and forth to either side of the drum without difficulty, further, the position of the operating levers is such that it is not necessary for the operator to stand close to the cable and he is not endangered thereby.

The dropping of the drum and nigger head is accomplished by the removal of the removal of the six or eight bolts which secure the spherical bearings to the frame.

From the foregoing description it will be obvious that I have perfected a very simple, convenient and efficient arrangement for mounting a winch on a motor truck.

What I claim is:—

1. In combination with a self propelled vehicle, a superimposed frame mounted on the chassis between the frame and the body of the vehicle and projecting rearwardly therefrom, a winch mechanism detachably secured to the underside thereof, auxiliary transmission mechanism secured to the frame and having driving connection with the said winch mechanism, and means for connecting the power take off shaft of the vehicle with the auxiliary transmission mechanism for driving the said winch.

2. In combination with a self propelled vehicle, a superimposed frame mounted on the chassis thereof between the frame and the body and projecting rearwardly therefrom, and having a winch mechanism detachably secured to the underside thereof in one unit, an auxiliary transmission mechanism secured between the frame members as another unit and connected to said winch mechanism, means for connecting the power take off shaft of the vehicle with the auxiliary transmission mechanism for driving the said winch mechanism, and manually operated means extending beyond the body for controlling the operation of the first unit.

In testimony whereof I affix my signature.

CHARLES B. CURTISS.